(12) United States Patent
Meeuwissen et al.

(10) Patent No.: US 7,599,986 B2
(45) Date of Patent: Oct. 6, 2009

(54) METHOD OF HANDLING OVERLAPPING NOTIFICATION REQUESTS IN NETWORKS WITH OPEN APPLICATION PROGRAMMING INTERFACES

(75) Inventors: Hendrik B. Meeuwissen, Huizen (NL); Harmanus Van Tellingen, Naarden (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 661 days.

(21) Appl. No.: 10/105,393

(22) Filed: Mar. 26, 2002

(65) Prior Publication Data
US 2003/0225823 A1  Dec. 4, 2003

(51) Int. Cl.
G06F 15/16 (2006.01)

(52) U.S. Cl. .................. 709/203; 709/223; 709/224; 715/700; 715/866; 707/104.1

(58) Field of Classification Search ......... 709/200–201, 709/203, 223–224, 227, 238; 707/3, 10, 707/104.1; 715/700–866
See application file for complete search history.

(56) References Cited

U.S. PATENT DOCUMENTS

| | | | | |
|---|---|---|---|---|
| 6,112,236 | A * | 8/2000 | Dollin et al. | 709/224 |
| 6,185,613 | B1 * | 2/2001 | Lawson et al. | 709/224 |
| 6,253,243 | B1 * | 6/2001 | Spencer | 709/224 |
| 6,336,139 | B1 * | 1/2002 | Feridun et al. | 709/224 |
| 6,611,873 | B1 * | 8/2003 | Kanehara | 709/238 |
| 6,665,721 | B1 * | 12/2003 | Hind et al. | 709/227 |
| 6,823,386 | B1 * | 11/2004 | Crump et al. | 709/227 |
| 6,832,239 | B1 * | 12/2004 | Kraft et al. | 709/203 |
| 2002/0161877 | A1 * | 10/2002 | Stevenson et al. | 709/223 |
| 2003/0061367 | A1 * | 3/2003 | Shah | 709/230 |
| 2003/0074439 | A1 * | 4/2003 | Grabarnik et al. | 709/224 |
| 2005/0171935 | A1 * | 8/2005 | Nowak et al. | 707/3 |

OTHER PUBLICATIONS

Comparing OMA OSE and Parlay Architectures, The Parlay Group, Mar. 2005.*

* cited by examiner

*Primary Examiner*—Thu Ha T Nguyen

(57) ABSTRACT

In the method of handling overlapping notification requests in a network with an open application programming interface, a response is received from a server to a notification request sent to the server based on a notification request entry in a plist. The notification request requests access to at least one object. Then, notification request entries in an rlist associated with the notification entry in the plist are identified, and the response is sent to an application associated with one of the identified notification request entries in the rlist. When a new notification request is received from an application, the new notification request is added to the rlist, and at least one of the plist and links between the notification request entries in the rlist and plist are altered. When a disable request requesting that a notification request be disabled is received from an application, at least one of the plist and links between the notification request entries in the plist and the rlist are altered.

22 Claims, 4 Drawing Sheets

METHOD OF HANDLING OVERLAPPING NOTIFICATION REQUESTS IN NETWORKS WITH OPEN APPLICATION PROGRAMMING INTERFACES

BACKGROUND OF THE INVENTION

1. Field of the Invention

The present invention relates to networks with open application programming interfaces, and more particularly, a method of handling overlapping notification requests in such networks.

2. Description of Related Art

The well-known Parlay specification, as well as other specifications such as OSA and JAIN, define an architecture that enables service application developers to make use of network functionality through an open standardized interface. The Parlay Application Programming Interface (API) contains the Framework APIs and Service APIs for Call Control, User Interaction, Messaging, and others. Similarly, OSA contains Service Capability Servers that include the Framework, Call Control, User Interaction, and others. OSA is based on Parlay, but emphasizes mobility. The Parlay Call Control API contains the interfaces IpCallControlManager and IpAppCallControlManager. The IpCallControlManager offers the enableCallNotification( ) method, which can be used by client applications to indicate their interest to be notified when certain call events take place. Its peer, the IpAppCallControlManager, offers the callEventNotify( ) method, which can be used to inform the application of the occurrence of a call event.

Events, such as call events in Parlay, are identified by event criteria in a notification request. The event criteria define the events required by the application. For example, the event criteria consist of OriginatingAddress, DestinationAddress, CallEventName, CallNotificationType, and MonitorMode in the enableCallNotification( ) method of Parlay. Actual events that meet these criteria are reported via the callEventNotify( ) method.

Because the method according to the present invention will be described, in part, based on examples with respect to Parlay, the event criteria of this specification will now be defined.

The OriginatingAddress and DestinationAddress are assumed to be E.164 addresses of length at least one satisfying $\{0, 1, \ldots, 9\}^n\{?\}^m\{*\}$, and n, m$\geq$0. In other words, address strings have length at least one, start with zero or more digits followed by zero or more question marks followed by zero or one *. The wildcard '?' stands for any digit, and '*' stands for a sequence of zero or more digits. Examples of valid addresses are 8, ?, *, 2?, 22??, 1*, and 65??*.

CallEventName specifies a call event. Possible events are OFFHOOK_EVENT=1, ADDRESS_COLLECTED_EVENT=2, ADDRESS_ANALYSED_EVENT=4, CALLED_PARTY_BUSY=8, CALLED_PARTY_UNREACHABLE=16, NO_ANSWER_FROM_CALLED_PARTY=32, ROUTE_SELECT_FAILURE=64, ANSWER_FROM_CALL_PARTY=128.

The CallNotificationType P_ORIGINATING specifies that the application is interested in triggers generated by the originating call state model, while P_TERMINATING specifies that the application is interested in triggers generated by the terminating call state model. This terminology is derived from the intelligent network.

The MonitorMode INTERRUPT specifies that the application will get access to the call object when it receives the callEventNotify( ) method, and control how call processing proceeds, while NOTIFY specifies that the application will only get a notification that a certain call state occurred in the network.

The Parlay specifications state that if some application issues a notification request with criteria that overlap the specified criteria in previously received notification requests, the newly issued request is refused. For example, in Parlay, the criteria are said to overlap if both originating and terminating ranges overlap and the same number plan is used and the same CallNotificationType is used. The point is that it should not be possible for applications to request access to the same object more than once. In Parlay and OSA, overlap can occur only between event criteria for which the monitor mode is set to INTERRUPT, since if the monitor mode is set to NOTIFY, no access to a call object is requested.

The approach of not allowing overlap between event criteria is robust, but has a number of disadvantages. For example, A single application is able to block requests for notifications from other applications. For example, in Parlay and OSA, notification requests with monitor mode INTERRUPT are blocked by using the event criteria OriginatingAddress=* and DestinationAddress=*.

New requests with overlapping event criteria are refused, even if there is only partial overlap with criteria in already requested notifications. For example, in Parlay and OSA, if OriginatingAddress=11??, DestinationAddress=2222, CallEventName=4, CallNotificationType=P_ORIGINATING, MonitorMode=INTERRUPT is already requested, then OriginatingAddress=1111, DestinationAddress=2???, CallEventName=4, CallNotificationType=P_ORIGINATING, MonitorMode=INTERRUPT is refused, although there is only overlap for one call event.

If applications disable or change notifications (e.g., using the disableCallNotification( ) or changeCallNotification ( ) methods in Parlay and OSA), other applications, whose requests might previously be refused, are unaware of these modifications. As a result, they might be missing events while this is not strictly necessary.

It is not possible to control dispatching of actual events to applications. An event goes to the application that requested the event first.

SUMMARY OF THE INVENTION

In the method according to the present invention, the no overlap requirement of conventional open API specifications, such as Parlay, OSA, JAIN etc., is satisfied while still permitting receipt of overlapping notification requests from applications. In one embodiment of the present invention, notification requests from applications are stored in a first list called an rlist. The entries made in the rlist are permitted to overlap. However, a second list called a plist, created from the entries in the rlist, contains no overlapping notification requests. Databases of links from the rlist to the plist and from the plist to the rlist are maintained. The notification requests in the plist are sent to one or more servers. When a server returns a response, the interested applications are identified using at least the rlist and in one embodiment the plist and the links from the plist to the rlist. The response is then delivered to one of the interested applications.

The delivery of the response is managed, in one embodiment, according to a methodology for prioritizing the interested applications, and is simply random or first come first serve in other embodiments.

In an implementation, an overlap handler logically disposed between the applications and the server or servers keeps and manages the notification requests, responses, rlist, plist and links according to the methodologies of the present invention. Specifically, the overlap handler includes methodologies for handling a new notification request from an application, handling a request to disable a notification request from an application, and handling a request to change a notification request.

In the methodology for handling a new notification request, the new notification request is added to the rlist, and at least one of the plist and the links between the entries in the plist and rlist are updated based on a comparison of the new notification request with one or more of the notification requests in the plist.

In the methodology for handling a request to disable/delete a notification request, the notification request is removed from the rlist and at least one of the plist and the links between the entries in the plist and rlist are updated.

In handling a request to change a notification request, the notification request being changed is disabled according to the methodology for handling a request to disable/delete a notification request, and changed version of the notification request is added according to the methodology of handling a new notification request. Either of the disabling and the adding can be performed first. Also, alternatively or additionally, in handling a request to change a notification, a determination is made as to whether changes can be made directly or whether no changes are required.

While still meeting the no overlap requirement for notification requests sent to the server or servers, the methodologies of the present invention also permit overlapping notification requests from the applications such that at least (1) a single application can not block requests for notifications from other applications; (2) new requests with overlapping event criteria are not refused (even if there is only partial overlap with criteria in already requested notifications); (3) if applications disable or change notifications (e.g., using the disableCallNotification( ) or changeCallNotification( ) methods), other applications do not miss events covered by those disabled or changed notifications; and (4) it is possible to control dispatching of actual events to applications.

BRIEF DESCRIPTION OF THE DRAWINGS

The present invention will become more fully understood from the detailed description given herein below and the accompanying drawings which are given by way of illustration only, wherein reference numerals designate corresponding parts in the various drawings, and wherein.

DETAILED DESCRIPTION OF EMBODIMENTS

The general architecture and functionality of the overlap handler according to the present invention will be described with respect to FIG. 1. This will be followed by a detailed description of the handling of a new notification request, handling of a request to disable/delete a notification request, handling of a request to change a notification request, and handling of a response to a notification request.

General Architecture and Functionality

Figure 1:
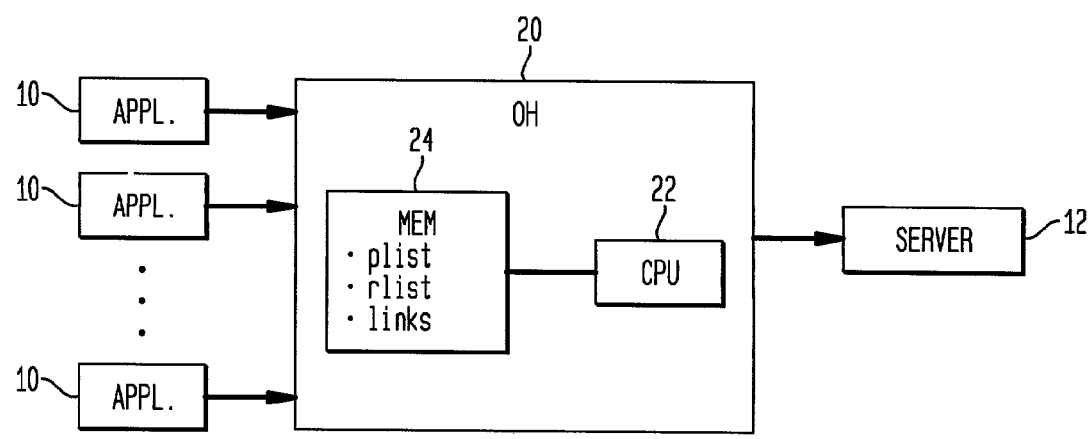
FIG. 1 illustrates an open application interface system incorporating an embodiment of the overlap handler according to the present invention.

FIG. 1 illustrates an open application interface system incorporating an embodiment of the overlap handler according to the present invention. As shown, a plurality of applications 10, running for example on one or more computer systems, are connected via one or more networks (not shown for the sake of clarity) to a server 12, running one or more open APIs according to an open API specification such as Parlay, OSA, JAIN, etc., by an overlap handler 20. While the overlap handler 20 has been illustrated as a device separate from the server 12, it will be understood that the overlap handler 20 could form part of the server 12. The overlap handler 20 includes at least one central processing unit 22, running the methodologies according to the present invention, and at least one memory unit 24 storing the plist and rlist databases (discussed in detail below) as well as the links (discussed in detail below) from the notification request entries in the rlist to the notification request entries in the plist and the links (discussed in detail below) from the notification request entries in the plist to the notification request entries in the rlist.

Notification requests issued by the applications 10 are received by the overlap handler 20 and added to (i.e., stored in) the rlist. Specifically, the notification request indicates by event criteria the objects required by the application (e.g., the enableCallNotification( ) method of Parlay and OSA for call events). The overlap handler 20 then compares the received notification request to the notification request entries in the plist and possibly modifies the plist, the links from the rlist notification request entries to the plist notification request entries, and the links from the plist notification request entries to the rlist notification request entries based on the comparison.

The overlap handler 20 delivers notification request entries in the plist to the server 12. When a response to a notification request is received, the overlap handler 20 accesses the plist, the rlist and the links between the plist and the rlist entries to determine to which of the applications 10 to deliver the response.

Handling of a New Notification Request

For the purposes of simplifying the explanation only, the handling of a new notification request will be described in the context of an open API specification according to Parlay. Also, suppose all event criteria in enableCallNotification( ) methods from applications satisfy CallEventName=4, CallNotificationType=P_ORIGINATING, and MonitorMode=INTERRUPT. If an application 10 sends a new notification request, the overlap handler 20 adds an entry to a database referred to as the rlist. The rlist is a database stored in the memory unit 24. In the rlist, the notification request is stored as an entry and an identifier for the application 10 is associated with the entry. The rlist is used to store notification requests issued by the applications 10 and identifiers identifying which notification requests are associated with which applications 10. In storing notification requests in the rlist, there is no prohibition against storing overlapping notification requests.

Next, the overlap handler 20 checks whether the event criteria in the new notification request entry in the rlist overlap with the event criteria that already exist in a database referred to as the plist. The plist is another database stored in the memory unit 24. Unlike the rlist, no overlapping notification request entries are permitted in the plist. As discussed above, it is from the plist that notification requests are sent to the server 12. Because the plist notification entries do not overlap, the notification requests sent to the server 12 comply with the no overlap requirement of open API standards like Parlay and OSA. The plist also stores an identifier, assigned by the server 12, in association with each of the notification request entries sent to the server 12.

To explain the process of checking the new notification entry in the rlist with notification entries in the plist, examine the following four cases that result when comparing OriginatingAddress $O_1$ and OriginatingAddress $O_2$:

| Notation | Description | Example |
|---|---|---|
| $O_1 \neq O_2$ | $O_1$ and $O_2$ are different and non-overlapping | $O_1 = 1111 \wedge O_2 = 8888$ |
| $O_1 = O_2$ | $O_1$ equals $O_2$ | $O_1 = 1111 \wedge O_2 = 1111$ |
| $O_1 \subset O_2$ | $O_1$ is a subset of $O_2$ | $O_1 = 1111 \wedge O_2 = 11??$ |
| $O_1 \supset O_2$ | $O_1$ is a superset of $O_2$ | $O_1 = 111? \wedge O_2 = 1111$ |

Now, examine the 16 cases that can occur when $O_1 \rightarrow D_1$ ($O_1$ calls $D_1$) is the only entry currently in the plist, and it is compared with $O_2 \rightarrow D_2$ ($O_2$ calls $D_2$), which is added to the rlist:

| Number | Case | Compare ($O_1 \rightarrow D_1, O_2 \rightarrow D_2$) | Example |
|---|---|---|---|
| 1 | $O_1 \neq O_2 \wedge D_1 \neq D_2$ | ADD | $1111 \rightarrow 2222$ ($O_1 \rightarrow D_1$) $8888 \rightarrow 9999$ ($O_2 \rightarrow D_2$) |
| 2 | $O_1 \neq O_2 \wedge D_1 = D_2$ | ADD | $1111 \rightarrow 2222$ $8888 \rightarrow 22222$ |
| 3 | $O_1 \neq O_2 \wedge D_1 \subset D_2$ | ADD | $1111 \rightarrow 2222$ $8888 \rightarrow 22??$ |
| 4 | $O_1 \neq O_2 \wedge D_1 \supset D_2$ | ADD | $1111 \rightarrow 222?$ $8888 \rightarrow 2222$ |
| 5 | $O_1 = O_2 \wedge D_1 \neq D_2$ | ADD | $1111 \rightarrow 2222$ $1111 \rightarrow 9999$ |
| 6 | $O_1 = O_2 \wedge D_1 = D_2$ | NO | $1111 \rightarrow 2222$ $1111 \rightarrow 2222$ |
| 7 | $O_1 = O_2 \wedge D_1 \subset D_2$ | UPDATE | $1111 \rightarrow 2222$ $1111 \rightarrow 22??$ |
| 8 | $O_1 = O_2 \wedge D_1 \supset D_2$ | NO | $1111 \rightarrow 222?$ $1111 \rightarrow 2222$ |
| 9 | $O_1 \subset O_2 \wedge D_1 \neq D_2$ | ADD | $1111 \rightarrow 2222$ $11?? \rightarrow 9999$ |
| 10 | $O_1 \subset O_2 \wedge D_1 = D_2$ | UPDATE | $1111 \rightarrow 2222$ $11?? \rightarrow 2222$ |
| 11 | $O_1 \subset O_2 \wedge D_1 \subset D_2$ | UPDATE | $1111 \rightarrow 2222$ $11?? \rightarrow 22??$ |
| 12 | $O_1 \subset O_2 \wedge D_1 \supset D_2$ | EXPAND | $1111 \rightarrow 222?$ $11?? \rightarrow 2222$ |
| 13 | $O_1 \supset O_2 \wedge D_1 \neq D_2$ | ADD | $111? \rightarrow 2222$ $1111 \rightarrow 9999$ |
| 14 | $O_1 \supset O_2 \wedge D_1 = D_2$ | NO | $111? \rightarrow 2222$ $1111 \rightarrow 2222$ |
| 15 | $O_1 \supset O_2 \wedge D_1 \subset D_2$ | EXPAND | $111? \rightarrow 2222$ $1111 \rightarrow 22??$ |
| 16 | $O_1 \supset O_2 \wedge D_1 \supset D_2$ | NO | $111? \rightarrow 222?$ $1111 \rightarrow 2222$ |

The result of this comparison has four possible outcomes as indicated in the above table:

NO means that no update of the plist is needed, i.e. $O_2 \rightarrow D_2$ is already covered by $O_1 \rightarrow D_1$ (cases 6, 8, 14, 16).

ADD means that $O_2 \rightarrow D_2$ has to be added to the plist. Note, if $O_1 \neq O_2 \vee D_1 \neq D_2$, the outcome is ADD (cases 1-5, 9, 13).

UPDATE means that $O_1 \rightarrow D_1$ in the plist has to be replaced by $O_2 \rightarrow D_2$ (cases 7, 10, 11).

EXPAND means that (1) $O_1 \rightarrow D_1$ and $O_2 \rightarrow D_2$ have to be expanded together to a (preferably minimal) number of non-overlapping criteria, (2) $O_1 \rightarrow D_1$ has to be removed from the plist, and (3) the result of the expansion should be added to the plist (cases 12, 15). As an example, in case 12, there is overlap for $1111 \rightarrow 2222$, $1111 \rightarrow 222?$ has to be removed from the plist, and $\{11?? \rightarrow 2222, 1111 \rightarrow 2220, 1111 \rightarrow 2221, 1111 \rightarrow 2223, \ldots, 1111 \rightarrow 2229\}$ could be added to the plist.

Next the methodology to update the plist when an entry is added to the rlist will be described in detail. For the purposes of this discussion, consider the situation that the length of the plist is arbitrary. Also assume a plist of event criteria for which enableCallNotification( ) methods are invoked on the server 12.

If a new notification request entry is added to the rlist, the new notification request, namely, the new event criteria are compared with the criteria of all the entries in the plist. Assume, for the purposes of explanation, a plist of length $l \geq 1$, since if the plist has length 0, no comparisons are necessary. The following different cases can be distinguished when the new event criteria are compared with all the entries in the plist:

1. A number of a outcomes ADD, followed by an outcome NO, followed by l-1-a outcomes ADD, $0 \leq a < l$.
2. A number of l outcomes ADD.
3. A number of l-n outcomes ADD and a number of n outcomes UPDATE, $1 \leq n \leq l$.
   Note, n=0 would yield the second case.
4. A number of l-m-k outcomes ADD, k outcomes UPDATE, and m outcomes EXPAND, $k \geq 0$, $m \geq 1$, $m+k \leq l$.
   Note that (1) k=0 and m=0 would yield the second case, (2) $k \geq 1$ and m=0 would yield the third case, (3) if k=0 only have outcomes EXPAND and ADD are possible, and (4) if m+k=l only outcomes EXPAND and UPDATE are possible.

Given the above possible results to the comparison, the overlap handler 20 proceeds as follows:

1. As soon as the comparison returns with outcome NO, the overlap handler 20 stops further comparisons as the new event criteria are already handled by an entry in the plist that yields NO. Since the plist does not contain overlapping events, if outcome NO occurs, previous comparisons for the new entry to the rlist yielded ADD and next comparisons will yield ADD as well. As a result, the length of the plist will remain the same. However, the p-to-r link database is updated to add a link from the entry in the plist causing the NO result to the new rlist entry, and the r-to-p link database is updated to add a link from the new rlist entry to the plist entry causing the NO comparison result.

2. If all comparisons return with outcomes ADD, the overlap handler 20 adds the new event criteria to the plist, since it is not covered yet. As a result, the length of the plist increases by 1 entry. The p-to-r and the r-to-p link databases are also updated to link the new rlist entry with the new plist entry.

3. If n ($n \geq 1$) comparisons return with outcomes UPDATE, and the others return with outcomes ADD, these n UPDATE entries from the plist have to be replaced by the new one. As a result, the length of the plist will reduce by n−1 entries. Also, the r-to-p link database and the p-to-r database are updated accordingly.

Example of third case (n=2)
plist: {1111→2222, 8888→9999, 1112→222 2}
New event criteria: 11??→2222
Comparison gives: {UPDATE, ADD, UPDATE}
Updated plist: {11??→2222, 8888→9999}

Figure 2:
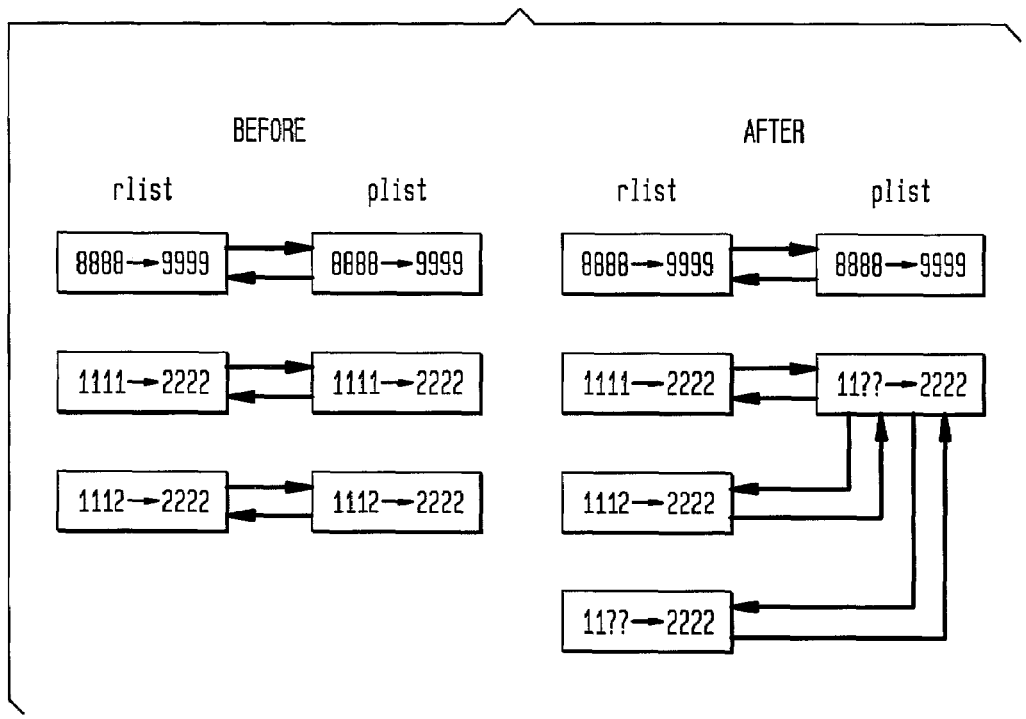
FIG. 2 graphically illustrates the link databases in a method example.

FIG. 2 graphically illustrates the links in the r-to-p and the p-to-r databases for the example given above.

4. If m (m≧1) comparisons return with outcome EXPAND, k (k≧0) comparisons return with outcome UPDATE, and the others return with outcome ADD, the overlap handler 20 removes the k UPDATE entries from the plist and expands the m EXPAND entries together with the new entry such that the length of the plist remains as short as possible. The length of the plist can increase considerably. Also, the r-to-p link database and the p-to-r link database are updated accordingly.

Example of fourth case (m=1, k=1)
plist: {1111→222?, 1111→3333, 8888→2222}
New event criteria: *→2222
Comparison gives: {EXPAND, ADD, UPDATE}
Updated plist: {1111→3333, *→2222, 1111→2220, 1111→2221, 1111→2223, . . . , 1111→2229}

Example of fourth case (m=2, k=0)
plist: {1111→222?, 1122→222?, 8888→2222}
New criterion: 11??→2222
Comparison gives: {EXPAND, EXPAND, ADD}
Updated plist: {8888→2222, 11??→2222, 1111→2220, 1111→2221, 1111→2223, . . . , 1111→2229, 1122→2220, 1122→2221, 1122→2223, . . . , 1122→2229}

Figure 3:
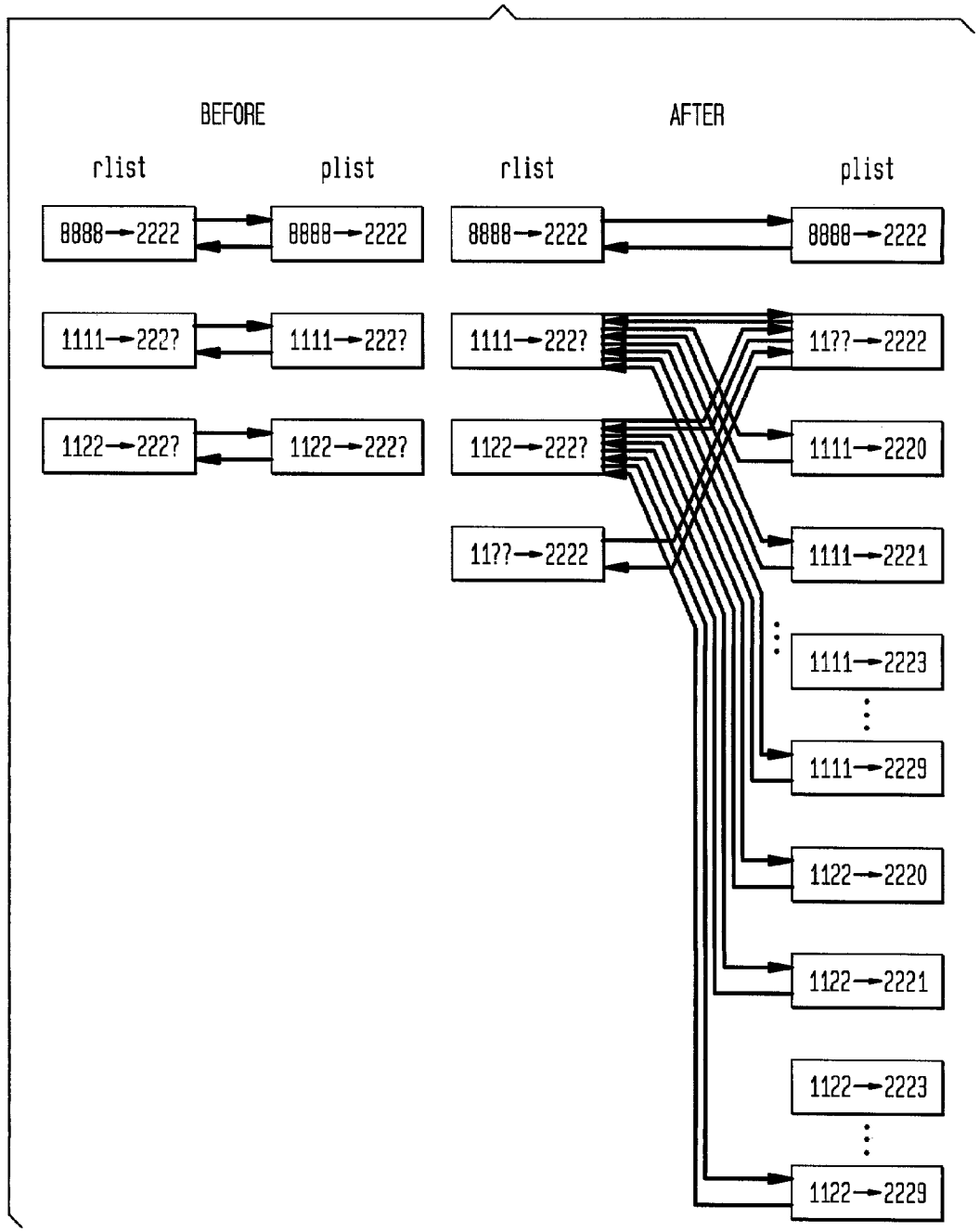
FIG. 3 graphically illustrates the link databases in another method example.

FIG. 3 graphically illustrates the links in the r-to-p and the p-to-r databases for the example given above.

Example of fourth case (m=1, k=0)
plist: {2222→*}
New event criteria: 22*→3333
Comparison gives: {EXPAND}
Updated plist: {2222→*, 220*→3333, 221*→3333, 223*→3333, . . . , 229*→3333, 2220*→3333, 2221*→3333, 2223*→3333, . . . , 2229*→3333, 2222?*→3333}

Example of fourth case (m=1, k=0)
plist: {????→2222}
New event criteria: 1111→22??
Comparison gives: {EXPAND}
Updated plist: {????→2222, 1111→220?, 1111→221?, 1111→223?, . . . , 1111→229?, 1111→2220, 1111→2221, 1111→2223, . . . , 1111→2229}

As will be readily appreciated from the above description, the methodology of handling a new notification request, while described with respect to the Parlay specification, is equally applicable to other open APIs like OSA. Furthermore, it will be appreciated that the overlap handler according to the present invention permits the handling of overlapping notification requests from applications, while still complying with the no overlap requirement of open API specifications like Parlay and OSA.

Handling of a Request to Disable/Delete a Notification Request

For the purposes of simplifying the explanation only, the handling of a request to disable/delete a notification request will be described in the context of an open API specification according to Parlay. Also, suppose all event criteria in enableCallNotification( ) methods from applications satisfy CallEventName=4, CallNotificationType=P_ORIGINATING, and MonitorMode=INTERRUPT.

For purposes of explanation, assume the methodology discussed below is implemented with a plist of event criteria for which enableCallNotification( ) methods have been invoked on the server. After receiving a disable notification request from an application 10, the overlap handler 20 performs the following:
1. Find the entry in the rlist (rEntry) that has to be removed and count the number of links, say c, to entries in the plist using the r-to-p link database.
2. If c=1:
  3. Remove the rEntry from the rlist and follow its link to the entry in the plist (pEntry).
  4. Count the number of links, say n, from the pEntry to entries in the rlist using the p-to-r link database.
  5. If n=1:
    6. Remove the pEntry from the plist and update the link databases accordingly.
  7. If n>1:
    8. Remove the pEntry from the plist.
    9. Find the other entries in the rlist by following the n−1 links of the pEntry, and copy them in the set of oEntries.
    10. If there are NO oEntries with links to entries in the plist other than the pEntry:
      11. Remove the oEntries that are contained in other oEntries from the set of oEntries, so that there is no overlap between the oEntries. Note, entry $O_1 \to D_1$ is contained in entry $O_2 \to D_2$ if $(O_1 \subseteq O_2 \wedge D_1 \subseteq D_2)$.
      12. Add the remaining oEntries to the plist.
      13. Update the link databases accordingly.
    14. If there are oEntries with links to entries in the plist other than the pEntry:
      15. For each oEntry that has links to entries in the plist other than the pEntry, obtain those entries in the plist (wEntries(oEntry)). Note, pEntry $\notin$ wEntries(oEntry). For each wEntry $\in$ wEntries (oEntry), remove the link to the oEntry and if the wEntry has no links to an entry in the rlist anymore, remove it from the plist.
      16. Remove the oEntries from the rlist, and add them to the rlist similar to the algorithm to update the plist when an entry is added to the rlist, which is described in the previous section.
17. If c>1:
  18. Remove the rEntry from the rlist and follow the links to the entries in the plist (pEntries). For each pEntry $\in$ pEntries, remove the link to the rEntry and if the pEntry has no links to an entry in the rlist anymore, remove it from the plist.

As an example, the table below shows the rlist and the plist when applications first send four enableCallNotification( ) methods and then two disableCallNotification( ) methods. Note that the event criteria of the fourth enableCallNotification( ) method overlap with all entries in the plist. More specifically, the comparison operation of the overlap handler 20 discussed in the previous section yields UPDATE three times. Therefore, all three entries in the plist are replaced by the new entry with event criteria 11??→2222. The first disableCallNotification( ) method requires no changes in the plist, while the second disableCallNotification( ) requires modification of the plist.

| Applications | Assignment ID to application | rlist | plist |
|---|---|---|---|
| enableCallNotification( ) with 1111 → 2222 | 1 | 1: 1111 → 2222 | 1111 → 2222 |
| enableCallNotification( ) with 1113 → 2222 | 2 | 1: 1111 → 2222 2: 1113 → 2222 | 1111 → 2222 1113 → 2222 |
| enableCallNotification( ) with 1117 → 2222 | 3 | 1: 1111 → 2222 2: 1113 → 2222 3: 1117 → 2222 | 1111 → 2222 1113 → 2222 1117 → 2222 |
| enableCallNotification( ) with 11?? → 2222 | 4 | 1: 1111 → 2222 2: 1113 → 2222 3: 1117 → 2222 4: 11?? → 2222 | 11?? → 2222 |
| disableCallNotification( ) with assignmentID 1 | NA | 2: 1113 → 2222 3: 1117 → 2222 4: 11?? → 2222 | 11?? → 2222 |
| disableCallNotification( ) with assignmentID 4 | NA | 2: 1113 → 2222 3: 1117 → 2222 | 1113 → 2222 1117 → 2222 |

Note that in the implementation of the methodology above, refinements can be made that can improve the efficiency in certain cases. For example, if the rlist contains {1111→2222, *→2222}, the plist contains {*→2222}, and the entry 1111→2222 is removed from the rlist, it is not most efficient to first remove *→2222 from the plist (step 8), and then add it again to the plist (step 12).

As will be readily appreciated from the above description, the methodology of handling a request to disable/delete a notification request, while described with respect to the Parlay specification, is equally applicable to other open APIs like OSA.

Handling of a Request to Change a Notification Request

When a request to change a notification request is received from an application 10 by the overlap handler 20, the overlap handler 20 first disables the notification request being changed according to the methodology discussed in the Handling of a Request to Disable/Delete a Notification Request section, and then treats the changed version of the notification request as a new notification request according to the methodology described in the Handling of a New Notification Request section.

In an alternative embodiment, when a request to change a notification request is received from an application 10 by the overlap handler 20, the overlap handler 20 first treats the changed version of the notification request as a new notification request according to the methodology described in the Handling of a New Notification Request section, and then disables the notification request being changed according to the methodology discussed in the Handling of a Request to Disable/Delete a Notification Request section.

Additionally, or alternatively, the overlap handler 20 examines the event criteria being changed by the request, and makes only those changes to the rlist, plist and links between the notification request entries in the rlist and plist to effect the change without performing the addition and disable methodologies. For example, if (for some reason) the notification request being changed and the changed version of the notification request are the same, the overlap handler 20 will determine that no changes are required. As another example, if the rlist and plist each contain entries which are only linked to each other and are the notification request entry being changed, then the entry in the rlist and plist is changed to the changed version of the notification request.

Handling of a Response to a Notification Request

For the purposes of simplifying the explanation only, the handling of a response to a notification request will be described in the context of an open API specification according to Parlay. Also, suppose the event info in callEventNotify( ) methods from the server 12 satisfies CallEventName=4, CallNotificationType=P_ORIGINATING, and MonitorMode=INTERRUPT. If the server 12 sends callEventNotify( ), it is possible that multiple applications are interested in the call event, since the rlist can contain overlapping event critiria. The set of interested applications can be determined in one of the following two different ways:

1. Find the entry in the plist associated with the response (e.g., the callEventNotify( ) method in Parlay) from the server 12. This entry in the plist resulted in the enableCallNotification( ) method to the server 12 that yielded the callEventNotify( ). Theoretically, this can also be a changeCallNotification( ) method. Then, follow the links to the entries in the rlist, and for only the linked entries in the rlist, determine whether or not the corresponding application is actually interested in the event. If the event is $O_1 \rightarrow D_1$ ($O_1$ and $D_1$ can not contain wildcards) and the entry in the rlist has event criteria $O_2 \rightarrow D_2$, the corresponding application is interested if and only if $O_1 \subseteq O_2 \wedge D_1 \subseteq D_2$. If the application is interested, add it to the set of interested applications.

2. For each entry in the rlist, determine whether or not the corresponding application is actually interested in the event. Recall, if the event is $O_1 \rightarrow D_1$ and the entry in the rlist has event criteria $O_2 \rightarrow D_2$, the corresponding application is interested if and only if $O_2 \subseteq O_2 \wedge D_1 \subseteq D_2$. If the application is interested, add it to the set of interested applications.

Which of the two ways is most efficient, depends on the lengths of the rlist and plist. The complexity of the first way depends on the length of the plist, while the complexity of the second way depends on the length of the rlist.

The overlap handler 20 then prioritizes the applications 10 in the set of interested applications. The overlap handler 20 can order the applications at random or use parameters like, for example, (1) time of day of the occurrence of the call event, (2) event criteria in the event of the call event, (3) application type, etc.

Example of Dispatching the Response to a Notification Request to an Application

Figure 4:
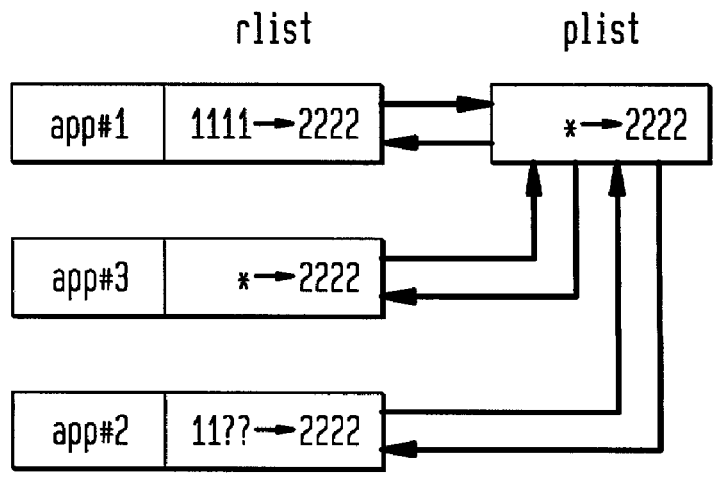
FIG. 4 illustrates a set of interested applications in describing an example of a priority methodology of the present invention.

Suppose (1) the event 1111→2222 occurs at 1006 hours, (2) the set of interested applications contains app#1, app#2, and app#3 as shown in FIG. 4, (3) the priority methodology uses the three parameters APLType, OriginatingAddressList, and TimeOfDay in that order, and (4) the parameters are configured as follows:

| clientAppID | APLType | OriginatingAddress List | TimeOfDay |
|---|---|---|---|
| app#1 | 2 | 1111, 2* | 0700–0900, 1100–1200 |
| app#2 | 2 | 1* | 1000–1015 |
| app#3 | 3 | 2222 | 0700–0900 |

First, the overlap handler 20 looks at APLType. Since app#3 has the highest APLType, it has the lowest priority (by convention). Then, it looks at OriginatingAddressList to bring down the choice. However, this parameter is not conclusive in this case. Next, the overlap handler 20 continues with TimeOfDay, which gives the highest priority to app#2. Therefore, the order of the applications (from lower to higher priority) is app#2, app#1, app#3, and the overlap handler 20 dispatches the event to app#2.

If no decision can be made based on the parameters, the overlap handler 20 orders the remaining applications at random Such a random choice is needed for example if the event in the example above occurred at 1030 hours, or if the parameters for two different applications are exactly the same. If the event can not be dispatched to the application with the highest priority (for example because it crashed), the next application in line can be tried, and so on and so forth.

As will be readily appreciated from the above description, the methodology of handling a response from the server, while described with respect to the Parlay specification, is equally applicable to other open APIs like OSA and JAIN. Furthermore, while still meeting the no overlap requirement for notification requests sent to the server 12, the overlap handler 20 also permits overlapping notification requests from the applications 10 such that at least (1) a single application can not block requests for notifications from other applications; (2) new requests with overlapping event criteria are not refused (even if there is only partial overlap with criteria in already requested notifications); (3) if applications disable or change notifications (e.g., using the disableCallNotification( ) or changeCallNotification( ) methods), other applications do not miss events covered by those disabled or changed notifications; and (4) it is possible to control dispatching of actual events to applications.

Multiple Server Embodiment

Figure 5:
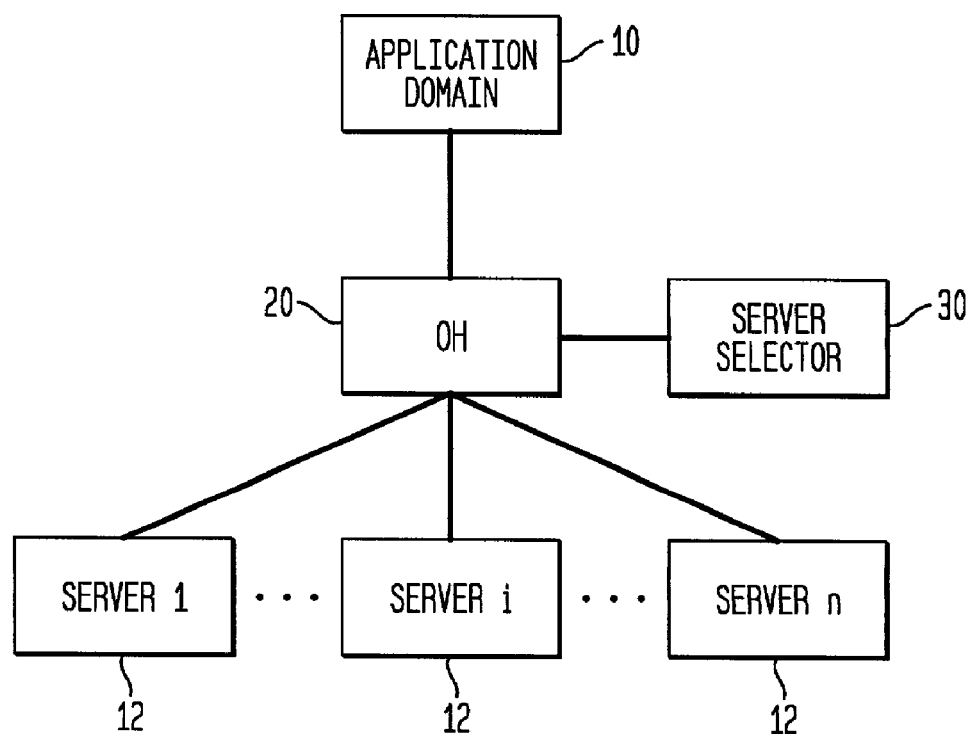
FIG. 5 illustrates another open application interface system incorporating an embodiment of the overlap handler according to the present invention.

While the method of the present invention has been described as implemented in a system including a single server, the method is not limited to this implementation. Instead, the methodology is equally applicable to a multiple server system as illustrated in FIG. 5. In the multiple server 12 embodiment of FIG. 5, a server selector 30 determines for each entry in the plist to which of the servers 12 a notification request should be sent. The logic of the server selector 30 can use the event criteria in the plist as well as configuration and status information for each of the servers 12 in making these decisions as will be readily appreciated by those skilled in the art.

The invention being thus described, it will be obvious that the same may be varied in many ways. Such variations are not to be regarded as a departure from the spirit and scope of the invention, and all such modifications are intended to be included within the scope of the following claims.

We claim:

1. A method of handling overlapping notification requests in a network with an open application programming interface, comprising:

receiving, at a device, a notification request from an application in a computer system requesting access required by the application, the device including at least one memory unit;

identifying notification request entries in a first list associated with a notification request entry in a second list, the first list and second list being stored in the at least one memory unit; and sending, from the device, a response to the notification request based on the notification request entry in the second list to the application associated with one of the identified notification request entries in the first list, the notification request requesting access to at least one object, and notification request entries in the second list are non-overlapping requests so as to comply with the open application programming interface.

2. A method of handling overlapping notification requests in a network with an open application programming interface, comprising:

receiving, at a device, a response from a server to a notification request sent by an application to the server based on a notification request entry in a plist, the notification request requesting access to at least one object;

identifying notification request entries in an rlist associated with the notification entry in the plist, the plist and rlist being stored in at least one memory unit; and sending, from the device, the response to an application associated with one of the identified notification request entries in the rlist, wherein notification request entries in the plist list are non-overlapping requests so as to comply with the open application programming interface.

3. The method of claim 2, wherein the identifying step identifies notification request entries in the rlist based on links between the notification request entries in the plist and the notification request entries in the rlist.

4. The method of claim 3, wherein at least one notification request entry in the plist has a link to more than one notification request entry in the rlist.

5. The method of claim 3, wherein the rlist includes at least two overlapping notification request entries.

6. The method of claim 2, further comprising:

receiving a new notification request from an application;

adding the new notification request to the rlist; and altering at least one of the plist and links between the notification request entries in the rlist and plist.

7. The method of claim 6, wherein the altering step comprises:

comparing the new notification request to notification request entries in the plist to determine if overlap exists between the new notification request and the notification request entries in the plist; and changing at least one of the plist and the links between the notification request entries in the rlist and the plist based on results of the comparing step.

8. The method of claim 7, wherein the changing step adds the new notification request to the plist if the comparing step indicates that the new notification request does not overlap with the notification request entries in the plist.

9. The method of claim 7, wherein the changing step updates a notification request entry in the plist to the new notification request and updates the links between the plist and the rlist accordingly if the comparing step indicates that a notification request entry in the plist is covered by the new notification request.

10. The method of claim 7, wherein the changing step updates the links between the rlist and the plist without changing the plist when the comparing step indicates that the new notification entry is covered by a notification request entry in the plist.

11. The method of claim 7, wherein the changing step expands the plist to cover non-overlapping requested objects when the comparing step indicates one of (i) the new notification request partially covers a notification request entry in the plist and (ii) a notification request entry in the plist partially covers the new notification request entry.

12. The method of claim 2, further comprising:
receiving, from an application, a disable request requesting that a notification request be disabled; and
altering at least one of the plist and links between the notification request entries in the plist and the rlist.

13. The method of claim 12, wherein the altering step alters one of the plist and the links between the notification request entries in the plist and the rlist based on the links from the disabled notification request entry in the rlist to notification request entries in the plist, hereinafter referred to as linked notification request entries, and the links from the linked notification request entries in the plist to non-disabled notification request entries in the rlist.

14. The method of claim 12, wherein the altering step comprises:
first determining the number of links from the disabled notification request entry in the rust to notification request entries in the plist;
removing the disabled notification request entry from the rlist;
removing the notification request entry in the plist linked to the disabled notification entry in the rlist if the first determining step determines that one link exists.

15. The method of claim 14, further comprising:
second determining the number of links from the removed notification request entry in the plist linked to notification request entries in the rlist other than the disabled notification request entry if the first determining step determines that one link exists:
third determining if the other notification request entries in the rlist have links to notification request entries in the plist excluding the removed notification request entry in the plist if the second determining step determines that more than one link exists; and
altering the plist and the links between the plist and the rlist based on the other notification request entries when the third determining step determines that the other notification request entries have no links to notification request entries in the plist other than the removed notification request entry.

16. The method of claim 14, further comprising:
second determining the number of links from the removed notification request entry in the plist linked to notification request entries in the rlist other than the disabled notification request entry if the first determining step determines that one link exists;
third determining if the other notification request entries in the rlist have links to notification request entries in the plist excluding the removed notification request entry if the second determining step determines that more than one link exists;
for each of the other notification request entries, when the third determining step determines that the other notification request entries do have links to notification request entries in the plist other than the removed notification request entry,
identifying notification request entries in the plist linked to each of the other notification request entries;
for each identified notification request entry in the plist,
removing the links from the identified notification request entry in the plist to the other notification request entry;
fourth determining whether another link exists from the identified notification request entry in the plist to a notification request entry in the rlist;
removing the identified notification request entry in the plist if the fourth determining step determines that no other links exist; and
altering the rlist, the plist and the links between the rlist and plist based on the other notification request entries.

17. The method of claim 12, wherein the altering step comprises:
first determining the number of links from the disabled notification request entry in the rlist to notification request entries in the plist;
removing the disabled notification request entry from the rlist;
identifying the notification request entries in the plist linked to the disabled notification request entry if the first determining step determines that more than one link exists;
removing the links from the identified notification request entries in the plist to the disabled notification request entry;
second determining, for each identified notification request entry in the plist, if links exist from the identified notification request entry in the plist to another notification entry in the rlist; and
removing the identified notification request entry in the plist from the plist if the second determining step determines that no links exist.

18. The method of claim 2, wherein the object is one of a call object, a software object and a reference to an interface.

19. The method of claim 2, further comprising:
receiving, from an application, a request to change a notification request entry in the rlist from a first notification request to a second notification request;
altering the rlist and at least one of the plist and links between the notification request entries in the plist and the rust as if the received request requested disabling the first notification request; and
second altering the rlist and at least one of the plist and links between the notification request entries in the plist and the rlist as if the second notification request was a newly received notification request.

20. The method of claim 19, wherein the second altering step is performed before the first altering step.

21. The method of claim 2, further comprising:
receiving, from an application, a request to change a notification request entry in the rlist from a first notification request to a second notification request; and
determining not to change the rlist, plist or the links between the notification request entries in the plist and rlist.

22. The method of claim 2, further comprising:
receiving, from an application, a request to change a notification request entry in the rlist from a first notification request to a second notification request; and
changing criteria in at least a notification entry in the rlist based on the request to change a notification request entry.

* * * * *

UNITED STATES PATENT AND TRADEMARK OFFICE
CERTIFICATE OF CORRECTION

PATENT NO. : 7,599,986 B2
APPLICATION NO. : 10/105393
DATED : October 6, 2009
INVENTOR(S) : Meeuwissen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1005 days.

Signed and Sealed this

Twenty-eighth Day of September, 2010

David J. Kappos
*Director of the United States Patent and Trademark Office*